United States Patent [19]

Kornylak

[11] 4,006,810
[45] Feb. 8, 1977

[54] RESILIENT CONVEYOR ROLLERS

[75] Inventor: Andrew T. Kornylak, Hamilton, Ohio

[73] Assignee: Kornylak Corporation, Hamilton, Ohio

[22] Filed: Mar. 31, 1976

[21] Appl. No.: 672,235

Related U.S. Application Data

[63] Continuation of Ser. No. 385,502, Aug. 1, 1973, abandoned, which is a continuation of Ser. No. 220,151, Jan. 24, 1971, abandoned.

[52] U.S. Cl. .............................. 193/37; 152/378 R
[51] Int. Cl.² ......................................... B65G 13/00
[58] Field of Search ........................................ 193/37

[56] References Cited

UNITED STATES PATENTS

| 96,635 | 9/1869 | Thomson | 301/39 R |
| 2,854,052 | 9/1958 | Smith et al. | 152/378 |
| 3,031,895 | 5/1962 | Kindig | 193/37 |
| 3,083,063 | 3/1963 | Alfson | 301/38 |

Primary Examiner—Stanley H. Tollberg
Assistant Examiner—Hadd Lane
Attorney, Agent, or Firm—Beall & Jeffery

[57] ABSTRACT

A flanged wheel for a roller conveyor is provided with a substantially solid elastomeric tire narrower than and surrounding the wheel without bonding thereto, the tire normally extending radially beyond the flanges. Compression set of the elastomer and consequent flat spots under excessive load are avoided by the load coming to rest on the rims of the flanges.

3 Claims, 5 Drawing Figures

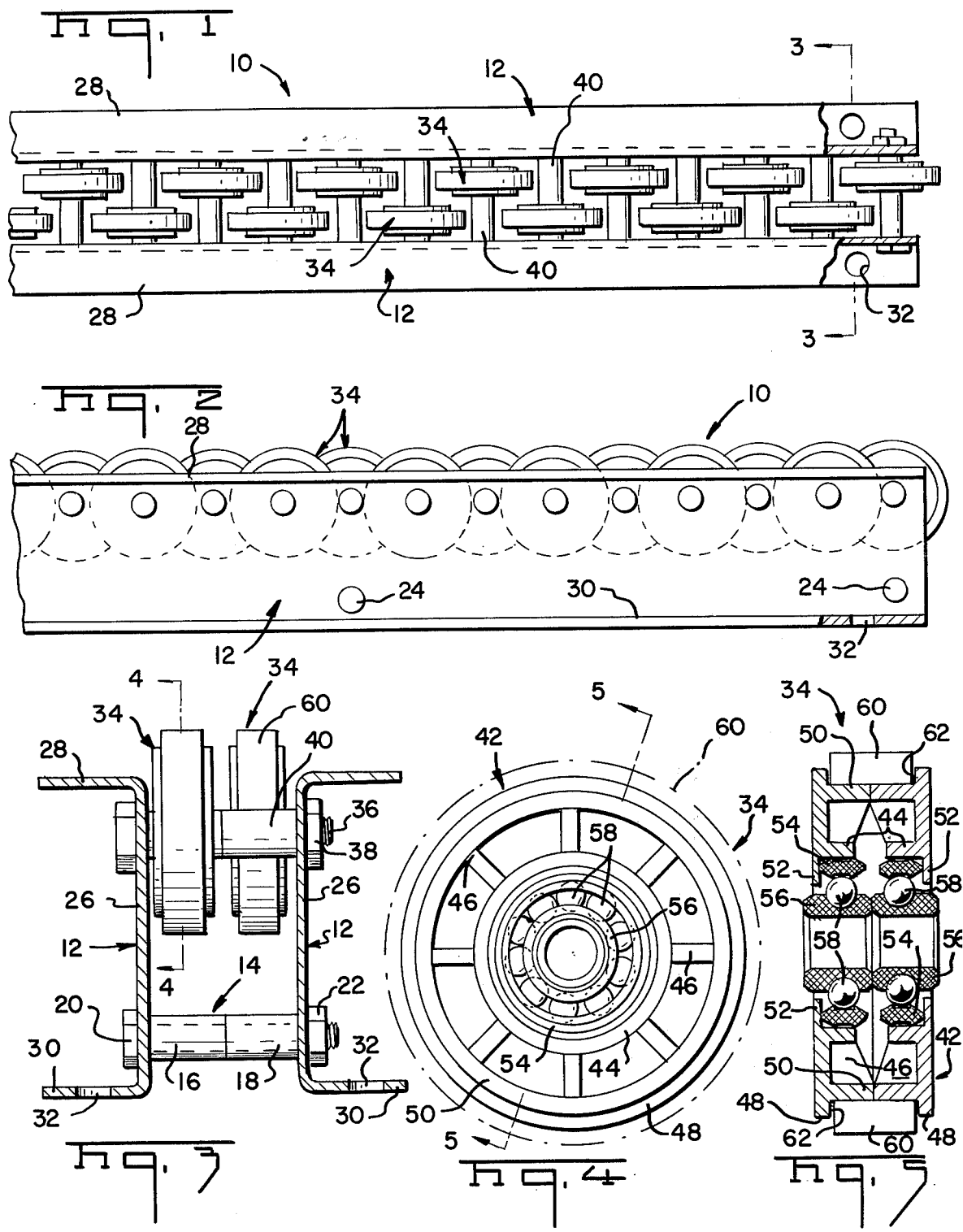

RESILIENT CONVEYOR ROLLERS

This is a continuation of application Ser. No. 385,502, filed Aug. 1, 1973 abandoned which is a continuation of Ser. No. 220,151 filed Jan. 24, 1971, abandoned.

This invention relates to an improvement in rollers such as used, for example, in rollerways disclosed in my U.S. Pat. No. 3,443,674 issued May 13, 1969.

As disclosed in my aforementioned patent, load conveyors which are provided with rollerways utilizing rollers covered with resiliently yieldable material are of great advantage in handling heavily loaded pallets. Such rollers tend to compensate for the unevenness of the load traveling thereover and the hysteresis property of the resilient material can be utilized to control the speed of a load when on an incline. In the patent, the resilient solid tire is molded onto the rim of the roller, and if the load thereon is such that the material of the tire is compressed beyond its elastic limit a "compression set" of the elastomer may be produced resulting in a flat spot and consequent resistance to rolling. In order to avoid such disadvantageous result, applicant has provided a roller with radially extending axially spaced flanges between which the solid resilient tire is mounted on the outer periphery of the wheel or roller. The tire is mounted on the roller rather loosely without any bond, is preferably narrower than the space between the flanges and its thickness dimension is greater than the flange height. It can thus be seen, that if the load on the rollers is excessive, the tire is compressed radially until the load can rest on the flanges. Since there is no binding between the tire and wheel, the material of the tire can move axially as it is compressed radially. Thus, compression set of the tire material and resultant flat spot can be avoided.

Another advantage provided by the present improvement is that tires of material of different elastomeric properties and thicknesses, depending on the load to be carried, may be separately provided and assembled with the rollers as required. This greatly reduces inventory. Furthermore, it is cheaper to produce tires separate from the wheels or rollers and the lack of need for a bond between the tire and wheel permits the use of non-bondable material, greatly extending the choice of materials to be used which would have the desired properties of hysteresis, hardness, temperature stability etc. and can be better matched to a particular load controlling need.

It is therefore an object of the invention to provide a roller, for a load conveying device, cooperating with a solid resilient tire mounted thereon that will not be permanently deformed by an excessive load.

It is a further object of the invention to provide a roller, for a load conveying device, having a solid resilient tire mounted loosely thereon without bonding.

It is still a further object of the invention to provide a roller, for a load conveying device, upon which is mounted a solid resilient tire in which the roller supports the load when the tire is compressed to a predetermined extent.

The above and further objects of the invention will become apparent as the description of the invention proceeds with specific reference to the drawings in which:

FIG. 1 is a top plan view, partly in section, of a conveyor utilizing the rollers of this invention;

FIG. 2 is a side elevation, partly in section;

FIG. 3 is a section along line 3—3 of FIG. 1;

FIG. 4 is a cross-sectional view of a roller of this invention taken along the axis thereof;

FIG. 5 is a view in elevation of a roller half at the side which is to be attached to the opposite half.

The rollerway 10 shown in FIG. 1 includes a pair of like elongate channel members 12 which are laterally spaced apart by sleeves 14 comprised of a pair of cylindrical members 16, 18. Bolts 20 pass through the sleeves and suitable openings in the walls 26 of the channel members and are secured by nuts 22. The channel members 12 have top and bottom flanges 28 and 30, respectively, the bottom flanges being provided with openings for use in securing sections of the rollerways on a support.

The rollers 34 may be mounted on threaded bolts 36 extending in parallel between the panels and secured thereon by means of nuts 38. As can be seen alternate rollers lie closer to one wall 26 and the other rollers lie closer to the opposite wall of the opposite channel member. The sleeves 40 mounted on the bolts 36 are of the proper length to maintain the rollers in the staggered arrangement above described.

As shown in FIG. 5, each roller is made of two separate like parts which are arranged as mirror images of one another and attached together in any desired manner, including welding. Each of the roller parts comprises a circular wheel half such as 42, which would be obtained if a wheel were cut diametrically of the axis midway between the flanges. Each wheel half includes a cylindrical hub portion 44 from one end of which there radially emanates a plurality of spokes 46 which are circumferentially equally spaced. The spokes are attached at their outer ends to a circular member 48 which extends radially outwards from the outer ends of the spokes. A cylindrical flange 50 concentric with and about the hub 44 is attached at one end to the circular member 48 at a location spaced inwardly from the outer periphery of the member 48 and adjacent to the zone of attachment thereof with the outer ends of the spokes. A relatively thin circular wall 52 extends from the inner wall of the hub radially into the bore thereof for a short distance, the wall being joined to the hub at the end from which the spokes emanate and being much thinner than the axial extent of the hub.

Fitted within the cylindrical hub member 44 of each half is a conventional ball bearing assembly, including an outer race 54, an inner race 56 and ball bearings 58. As can be seen from FIG. 5, when the ball bearing assembly is mounted within the hub member 44 with the outer periphery of the outer race 54 in firm contact with the inner periphery of the hub member and one side abutting the inner surface of wall 52, the end of inner race 56 furthest from wall 52 terminates in the plane of the free end of cylinder 50. The opening provided by the circular wall 52 accomodates a portion of the inner race 56 when the assembly is mounted within the hub. The roller halves 42 may be fabricated of metal or plastic but it is preferred to mold them of the latter mentioned material. The roller halves are assembled together by axially alining the two halves with the free ends of the cylinders in abutting relationship. Before such assembly the abutting edges may be coated with a bonding material and held in abutting relation under pressure until bonded. The halves can also be bonded together by ultrasonic welding techniques well known in the art.

After securing the two halves of the roller together the entire assembly forms a cylinder provided by the abutting cylindrical members 50 and a pair of radially outwardly extending flanges at respective opposite ends of the cylinder formed by the circular members 48. A solid tire 60 of elastomeric material is mounted on the outer periphery of the roller formed by the abutting cylindrical halves 50. The tire is an integrally formed member having an inner diameter substantially that of the outer diameter of the abutting cylinders 50 and is of a lesser width than the distance betwen the flanges provided by the circular members 48. The said flanges may each having their inner walls 62 tapering outwardly toward their free ends. Such taper may be in the range of 5° – 10° from a vertical to the outer surface of the roller. The tire may fit the periphery of the cylinder formed by the members 50 snugly or even loosely is so desired and is unbonded thereto. The inner periphery of the tire may be provided with horizontal corrugation if so desired, to increase the friction between it and the wheel to increase the friction for driving the latter when a load is supported on the outer surface of the tire. The thickness dimension of the tire is such that its outer surface extends radially outwardly beyond the flanges formed by members 48. A preferred ratio of thickness dimension to the height of the flange is 2:1.

The material of the tire may be similar to that described in my aforementioned U.S. Pat. No. 3,443,674, although the properties of hysteresis, hardness, temperature stability, solvent and chemical resistance may be varied in accordance with the load and the environment in which it is to be utilized. What is important is that the tire material be of such nature that it does not retain a deformity, such as a "compression set" before a load placed thereon reaches the flanges of the roller which form a barrier to further compression of the tire. It can be seen that a load on the tire will compress it radially, and since the tire is narrower in width than the distance between the flanges, the material of the tire can move axially along the surface of the roller since it is unsecured thereto. When a load in excess of that for which the elastomeric tire is designed is supported thereon, the compression of the material to the point of permanent deformation thereof is avoided by the flanges which support the load to form a barrier to excessive tire radial compression.

As can be readily understood from the above description of the invention, the wheels may be made of different widths to accept wider tires. This helps when handling heavier loads, since the hysteresis control has been found to be more effective if the load contact is kept at approximately 400 lbs. per square inch. Wider tires are also desirable when alignment of the load is important, such as a skid width a narrow runner which may miss a narrow tire if not properly aligned therewith. By utilizing the molding process of making the roller halves, as previously indicated, the making of wheels of different widths is simplified.

Having thus described the invention with the particularity required by the statutes, it should be understood that various changes and modifications without departure from the scope and spirit of the invention are covered by the appended claims.

What is claimed is:

1. A gravity undriven roller conveyor, comprising: a stationary inclined rigid conveyor support; a plurality of substantially identical idler conveyor rollers serially arranged in a conveying direction downwardly along said inclined conveyor support; bearing means freely rotatably mounted each of said conveyor rollers on said conveyor support with parallel axes of rotation in a common inclined plane, said axes being perpendicular to said conveying direction down said inclined plane for supporting loads on said conveyor rollers and conveying loads from the top of said inclined conveyor support to the bottom of said inclined support solely by gravity; each of said rollers having a rigid wheel including an outer annular bearing surface concentric with its axis of rotation and a pair of axially spaced flanges integrally extending radially outwardly from axially opposed sides of said outer annular bearing surface; an annular tire of elastomeric material freely mounted on each wheel between said flanges and normally being of less axial width throughout its thickness than the corresponding axial space between said flanges; said tire having an inner annular bearing surface of complimentary shape with said wheel outer bearing surface and being mounted on said wheel for free axial and circumferential relative movement between said inner and outer bearing surfaces of said tire and wheel respectively; said tire having a radial thickness greater than the radial depth of said flanges; said elastomeric material of said tire having an elastic limit by which it acquires a permanent deformation when radially compressed; and said flanges being of a radial depth relative to the radial thickness of said tire to completely receive the elastomeric material of the tire and directly engage a load being conveyed before the elastic limit of said elastomeric material is reached under radial compression by the load being conveyed.

2. A gravity roller conveyor according to claim 1, wherein the radial thickness of said tire is approximately twice the radial depth of said flanges, and correspondingly said elastomeric material may undergo a compression greater than 50% before being permanently deformed to take a compression set.

3. The gravity conveyor according to claim 1, wherein said rigid wheel is constructed of synthetic resin.

* * * * *